United States Patent [19]
Corry

[11] Patent Number: 5,557,966
[45] Date of Patent: Sep. 24, 1996

[54] COOLING SYSTEM PRESSURE TESTING DEVICE FOR LEAK DETECTION

[76] Inventor: Kevin A. Corry, 74 Lamington Ave., Lutwyche, Queensland 4030, Australia

[21] Appl. No.: 271,326

[22] Filed: Jul. 6, 1994

[30] Foreign Application Priority Data

Jul. 6, 1993 [AU] Australia ................................ PL9794

[51] Int. Cl.⁶ .............................. G01M 3/04; G01M 3/32
[52] U.S. Cl. ................ 73/49.7; 73/49.8; 73/756
[58] Field of Search ................... 73/49.7, 49.8, 73/49.2 T, 49.2 R, 49.6, 49.3, 40.5 R, 756, 731; 604/96, 97, 98

[56] References Cited

U.S. PATENT DOCUMENTS

| | | | |
|---|---|---|---|
| 1,041,156 | 10/1912 | Payne | 73/40.5 R |
| 2,273,984 | 2/1942 | Osborn | 73/40.5 R |
| 2,457,244 | 12/1948 | Lamson | 604/96 |
| 3,062,012 | 11/1962 | Allen | 73/40.5 R |
| 3,595,255 | 7/1971 | Mulinex . | |
| 3,797,708 | 3/1974 | Sypal . | |
| 3,802,449 | 4/1974 | Mulinex . | |
| 3,840,033 | 10/1974 | Warsinger . | |
| 3,938,521 | 2/1976 | Ritota et al. | 604/96 X |
| 3,991,604 | 11/1976 | Hayes et al. . | |
| 4,386,531 | 6/1983 | Heimgartner et al. | 73/756 |
| 4,890,483 | 1/1990 | Vetter . | |
| 4,976,725 | 12/1990 | Chin et al. | 604/98 X |
| 5,105,653 | 4/1992 | Konter | 73/756 X |
| 5,300,027 | 4/1994 | Foote et al. | 604/98 X |
| 5,312,430 | 5/1994 | Rosenbluth et al. | 604/96 X |
| 5,316,016 | 5/1994 | Adams et al. | 604/96 X |

Primary Examiner—Richard Chilcot
Assistant Examiner—Joseph L. Felber
Attorney, Agent, or Firm—Robbins, Berliner & Carson

[57] ABSTRACT

The invention concerns a cooling system pressure testing device for the purpose of leak detection. The device has a bladder with a passage extending therethrough. The bladder may be inflated to lock it within an opening in an object to be pressure tested and once inflated fluid may be passed through the passage to pressurize the object being tested.

13 Claims, 3 Drawing Sheets

COOLING SYSTEM PRESSURE TESTING DEVICE FOR LEAK DETECTION

BACKGROUND OF THE INVENTION

This invention relates to a cooling system pressure testing device. In particular the invention concerns a pressure testing device for cooling systems for engines and for pressure testing applications and purposes for the types of cooling systems.

Cooling system analyzer kits are known. One such kit is marketed by Waekon Industries Inc. in Pennsylvania. That known kit includes a pressure probe assembly and a plurality of adaptor cap fittings designed to suit a variety of radiator neck configurations and sizes. The pressure probe includes a pressure gauge and is adapted for receiving pressurized air from a compressor. The probe has an outlet connectable to a selected one of the adaptor cap fittings.

To use this kit the appropriate adaptor cap fitting is selected to suit the radiator neck configuration and size of the cooling system being tested and the cap fitting is secured to the neck of the radiator. The pressure probe is then coupled to the cap fitting and the air compressor and an attempt is made to pressurize the cooling system to the desired pressure.

Kits of this type typically included about eight adaptor cap fittings and this adds to the total expense of the kit. The range of cap fittings available does not cover all possible radiator neck configurations and sizes and often cap fittings were lost or misplaced.

It is an object of the present invention to provide a pressure testing device which at least minimize the disadvantage referred to above.

SUMMARY OF THE INVENTION

According to one aspect, the invention provides a pressure testing device for attachment in an inlet opening in an object to be pressure tested, the pressure testing device including a sealing head positionable in the opening, the head having a bladder with an inlet, a passage extending through the bladder and having an inlet for coupling to a source of fluid pressure and an outlet, whereby the bladder may be inflated to close off the inlet opening to the object and the passage enabling the object to be pressurized while the bladder closes off the inlet opening.

The bladder may be made of any elastic or distensible material. For example, the bladder may be made of natural or synthetic rubber.

The bladder may be any suitable shape or size provided of course that when inflated or elastically expanded it is able to effectively seal off the inlet opening in the object being tested. In one embodiment the bladder extends around and at least partially along the passage and is sealed to provide a cavity between the passage and bladder. The bladder may be sealed against the passage. Preferably the bladder is sealed against the passage at spaced locations along it. Alternatively, rather than directly seal the bladder relative to the passage, the sealing may be achieved via some intermediate member or fitting.

In one embodiment the bladder is substantially cylindrical in shape when deflated and may have a portion thereof distended when inflated. Preferably an intermediate portion of the bladder assumes a bulbous configuration when the bladder is inflated.

The bladder may assume a pear shaped distension when inflated so that the larger part of the pear shaped portion may be retained innermost in the inlet opening in the object being pressure tested. In this way, when the object is pressurized the tendency for the sealing head to be accidentally ejected from the inlet opening is minimized. The bladder may have an external marking which provides a guide for assisting in the proper positioning of the sealing head within the inlet opening.

The bladder, rather than being substantially cylindrical in shape when deflated, may be toroidal or donut shaped with the passage extending through the central aperture of the torus.

As mentioned, the bladder and passage may be integrally formed, as a unitary component. It is preferred that the passage be present as a component separate from the bladder. The passage may be provided by a conduit or tube. The conduit may be relatively rigid or alternatively may be made of flexible material and thus the head may be flexible. It is preferred that the outlet from the passage does not extend substantially beyond the bladder.

The inlet to the bladder and the inlet to the passage may be coupled to the same or different source of pressurized fluid such as air. Preferably both inlets are coupled to the same source of pressurized air. It is preferred that respective air lines or conduits be employed for this purpose. A common pressure gauge is preferably associated with each air line or alternatively such a gauge is present and associated with the source of pressurized air or just associated with the passage extending through the bladder. Where a common gauge is associated with each air line, a valve is present to alternatively couple the gauge and hence the supply of air to one or the other of the air lines. If a separate supply of air is available for each air line then such a valve need not be necessary.

It is preferred that at least one venting valve be provided for venting the bladder and/or the passage to the atmosphere. Preferably two separate venting valves are present for this purpose. The venting valves may be associated with the air lines.

The supply or pressurized air may be provided by a compressor. Alternatively a manually operable pump may be employed to supply the pressurized air. Preferably a hand operated pump is employed.

BRIEF DESCRIPTION OF THE DRAWINGS

Particular preferred embodiments of the invention will now be described by way of example with reference to the drawings in which.

DETAILED DESCRIPTION OF THE INVENTION

Figure 1:
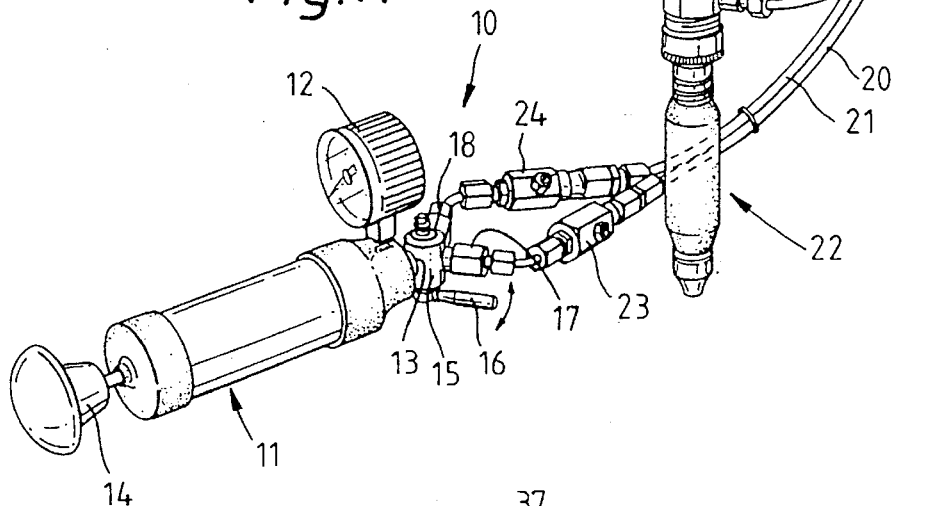
FIG. 1 is a detailed view of a pressure testing device according to an embodiment of the invention.

As shown in FIG. 1, the pressure testing device 10 includes a pump 11 having an operating piston 14 and an outlet 13. A pressure gauge 12 projects from the pump 11 adjacent outlet 13 and is operative to determine the pressure of air supplied to air lines 20, 21 via two way valve 15.

The valve 15 has an operating lever 16 and outlets 17, 18 for supplying air to lines 20, 21. The lever 16 is operative to selectively direct pressurized air to either line 20 or 21. The valve 15 may have a further position for venting the pressure in the object being tested. Relief valves 23, 24 are connected in lines 20, 21 and enable pressure in the lines to be vented to the atmosphere. Relief valve 24 may be omitted if desired. These relief valves may also function as non-return valves in addition to allowing the air lines to be vented to the atmosphere.

Testing head 22 has lines 20, 21 coupled to it. The head 22 is shown in greater detail in FIG. 2. The head has a fitting 25 which allows air line 21 to be connected to passage or tube 26 and a fitting 27 which allows the line 20 to be coupled to inflate the bladder 28.

The bladder 28 is sealed at one end relative to the tube 26 and adjacent to outlet 29 from the tube 26. This is achieved by a plug 30. The other end of the bladder 28 is sealed relative to the exterior of the tube 26 by plug 31. Plug 31 has a short cylindrical tube 32 and it is between this tube 32 and fitting 27 that the bladder 28 is captured. Air is introduced into the cavity 33 between the bladder 28 and tube 26 via fitting 27 and through tube 32. This allows the bladder 28 to be inflated as shown in the Figure.

Figure 2:
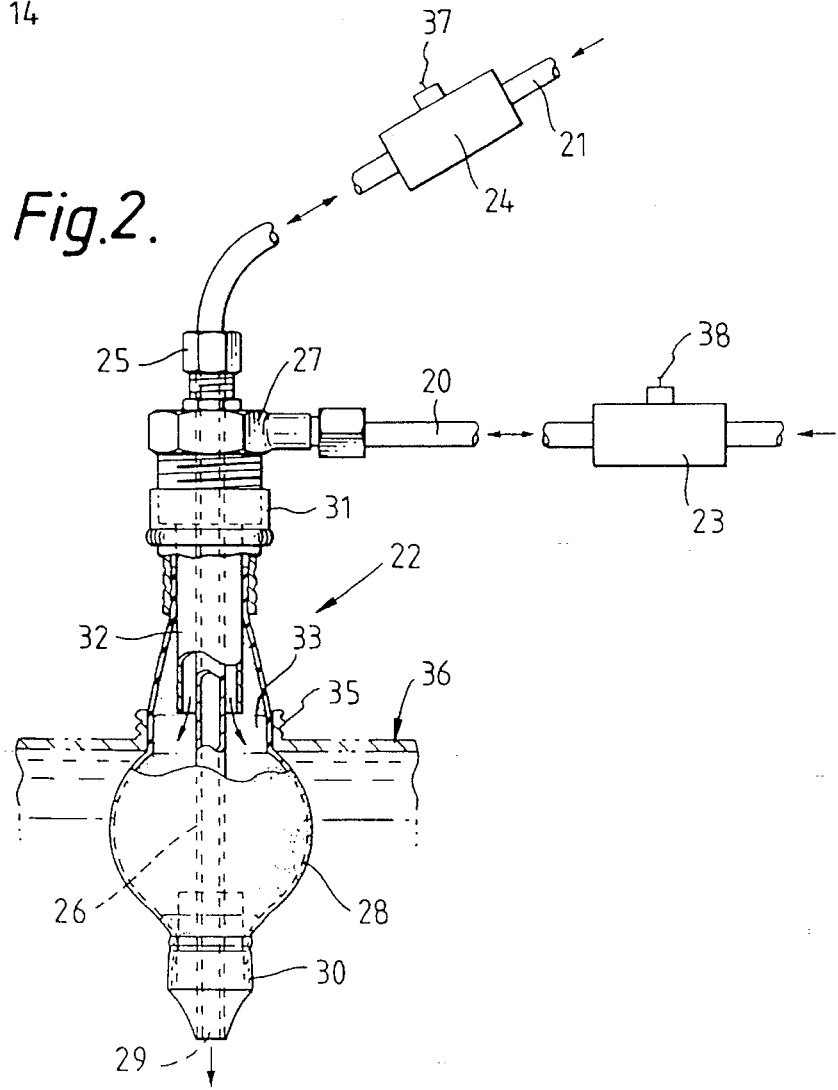
FIG. 2 is a sectional detailed view of the testing head which forms part of the device of FIG. 1.

The operation of the pressure testing device of FIGS. 1 and 2 is as follows. With the head 22 deflated as shown in FIG. 1, the head may be inserted into the neck 35 of a radiator 36. Once inserted, lever 16 is moved to the position shown in FIG. 1 and piston 14 is operated to inflate the bladder 28 the required amount to seal the bladder relative to the neck 35 of the radiator 36. Once the neck is sealed, lever 16 is moved to its alternative position so that operation of piston 14 directs pressurized air via line 21 and through tube 26 to pressurized the radiator 36. Readings taken from gauge 12 enable the operator to determine whether any faults are present in the cooling system of which the radiator 36 is a part.

The pressure within the radiator 36 may be vented before any attempt is made to remove the head from the radiator. Valve 24 may be manually operated by depressing stem 37. Alternatively the valve 15 may be provided with a vent opening intermediate outlets 17, 18, In this way movement of the lever 16 back to the position shown in FIG. 1 will vent the radiator.

Once pressure within the radiator is relieved, valve 23 may be operated by depressing stem 38. This causes the bladder 28 to return to the condition of FIG. 1.

The head 22 shown in FIG. 2 may be used to pressure test a radiator in a manner different from that possible with the device shown in FIG. 1 and without employing a valve 15.

A supply of air under pressure say from a compressor may be initially coupled to valve 23 to inflate the bladder to lock the head relative to the neck of a radiator being tested. Valve 23 functions as a non-return valve and for venting the pressure in the bladder to the atmosphere once the test is complete. With the bladder inflated the source of air is then transferred to be applied through valve 24, through outlet 29 and into the radiator. Indeed valve 24 may be omitted from this circuit. The pressure applied to the radiator may be determined by a gauge associated with the compressor or alternatively a separate pressure gauge maybe in the air line between tube 26 and the source of air. When the test is complete the source of air is removed, valve 23 operated to vent the bladder. This in turn releases the pressure within the radiator. Alternatively, if a valve like valve 24 is present, it may be operated to vent the radiator before the bladder is deflated.

Figure 3:
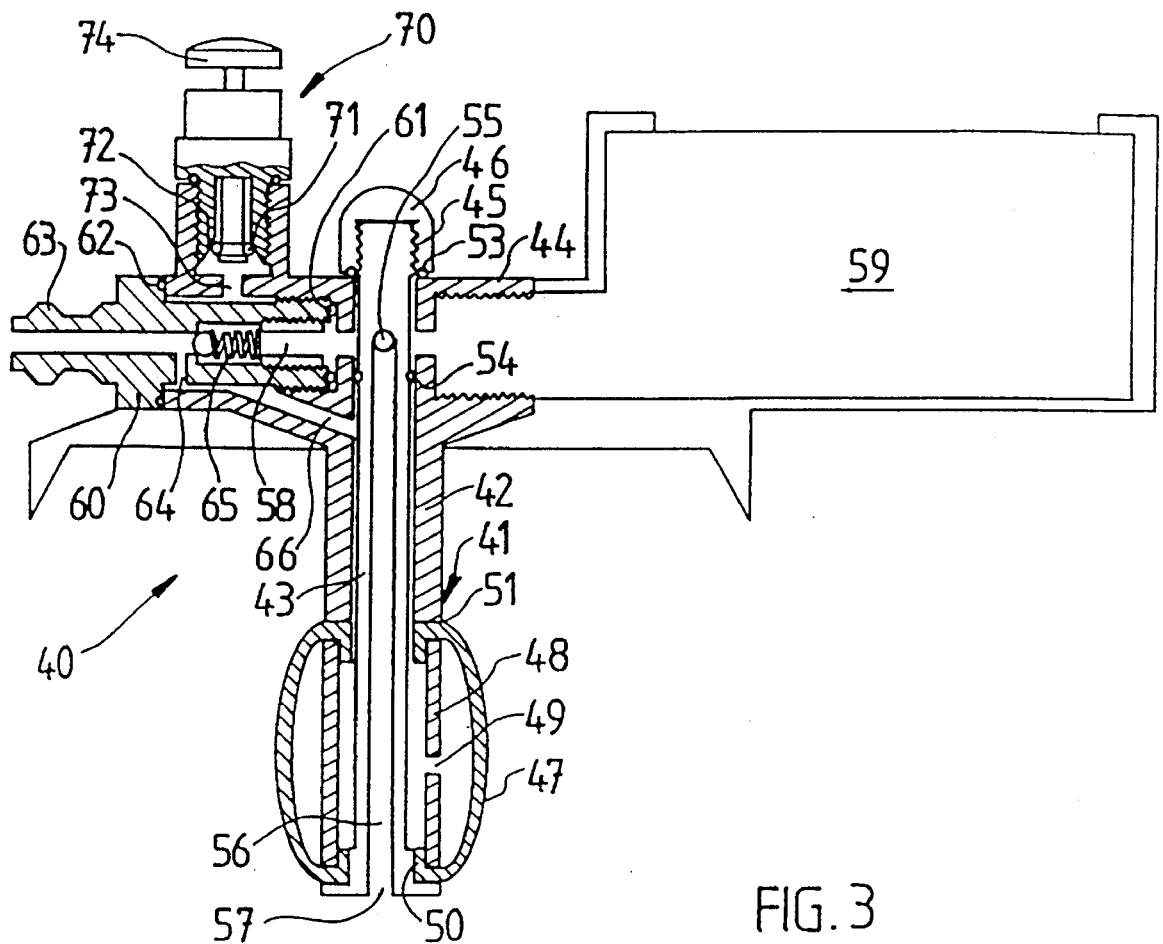
FIG. 3 is a sectional view of a second embodiment of a device according to the invention.

FIG. 3 shows a further embodiment of a pressure testing device according to an embodiment of the invention. The device 40 has an elongate head 41 having a hollow stem 42 within which a hollow spindle 43 is received. The spindle 43 projects through a body 44 and is secured at one end 45 by a threaded fastener 46. The fastener may have a bore through it (normally seated) to accommodate a probe communicating with passage 56.

The other end of the spindle receives a bladder assembly consisting of a bladder 47 and a cylindrical bladder support 48. The support has an aperture 49 which enables fluid to enter into the space between the support 48 and the bladder 47 to facilitate inflating and deflating of the bladder.

Figure 3A:
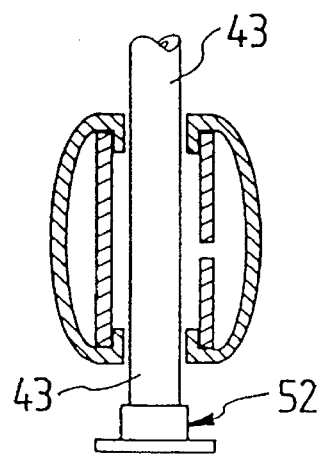
FIG. 3A is a detailed exploded view of a portion of the head shown in FIG. 3.

The bladder 47, when deflated, is essentially cylindrical in shape and has short return portions 50, 51 at its ends. The lower end of the hollow spindle 43 is stepped at 52 as shown in FIG. 3A and when the device is assembled and fastener 46 tightened the stepped portion 52 is drawn up against an end of the bladder 47 adjacent return portion 50 to seal one end of the bladder. The other end of the bladder is drawn against the free end of the hollow stem 42 of the body 44. Clearance remains between the spindle 43 and an inner surface of return portion 51 to enable fluid to flow in the space between the spindle and return portion 51, through aperture 49 and into the space between support 48 and the bladder 47.

A sealing ring 53 seals the spindle relative to an outer face of the body 44 when fastener 46 is tightened. A further sealing ring 54 extends around spindle 43 just below transverse port 55. Port 55 communicates with bore 56 extending through the spindle. Bore 56 terminates at an outlet 57. That portion of the spindle between rings 53 and 54 is a clearance fit within the body 44 and thus fluid from passage 58 is able to flow through port 55 and into the bore 56 as well as communicate with the pressure gauge 59.

The body 44 has a valve passage having an inner threaded end and an outer unthreaded end for receiving a valve spindle 60. The valve spindle 60 is sealed against an inner end of the valve passage by a seal ring 61 and against an outer face of the body 44 by a further seal ring 62.

The valve spindle has an inner threaded and which mates with the inner threaded end of the valve passage, an outer end 63 to which a source of pressurized fluid may be connected and an intermediate portion of smaller diameter than the inner threaded end. This reduced portion provides clearance between it and an adjacent part of the valve passage. The valve spindle has a longitudinally extending passage 58 and communicates with transverse passage 64.

A spring biased valve 65 is located within passage 58 and normally seals off that passage such that fluid entering through end 63 does not communicate with the gauge 59 or bore 56. Rather, this fluid flows from end 63 through part of passage 58, through passage 64 and through bypass passage 66. The fluid flowing through bypass passage 66 is then able to inflate the bladder 47.

Once a predetermined bladder pressure is reached, the bias on valve 65 is overcome, no further pressurization of the bladder takes place and fluid then communicates with the gauge 59 and is caused to exit from outlet 57.

The body 44 has mounted to it a relief valve 70 having a valve member 71 which normally seals against a seat 72. This valve communicates with the space existing between the valve passage and the reduced intermediate portion of the valve spindle 60 via transverse bore 73 and hence with the bladder 47. Once the bladder has been inflated it may be deflated by depressing operating member 74 to unseat valve member 71.

The device of FIG. 3 is used in the following manner to pressure test the cooling system of a device.

The head 41 is positioned within the neck of a radiator in the cooling system. A source of pressurized fluid such as air is coupled to end 63 and the bladder 47 is inflated to seal the head 41 relative to the neck of the radiator. Once the pressure within the bladder reaches a predetermined level valve 65 opens and further pressurization of the bladder does not occur. Rather the air communicates with gauge 59 and bore 56 and escapes from outlet 57 to pressurize the radiator. If the radiator pressure achieved is of desired level then the radiator passes the pressure test.

To remove the device from the radiator the pressure within the bladder may be relieved by either operating the relief valve 70 or removing the source of air from end 63. Once the bladder deflates the device may be removed from the radiator.

Figure 4:
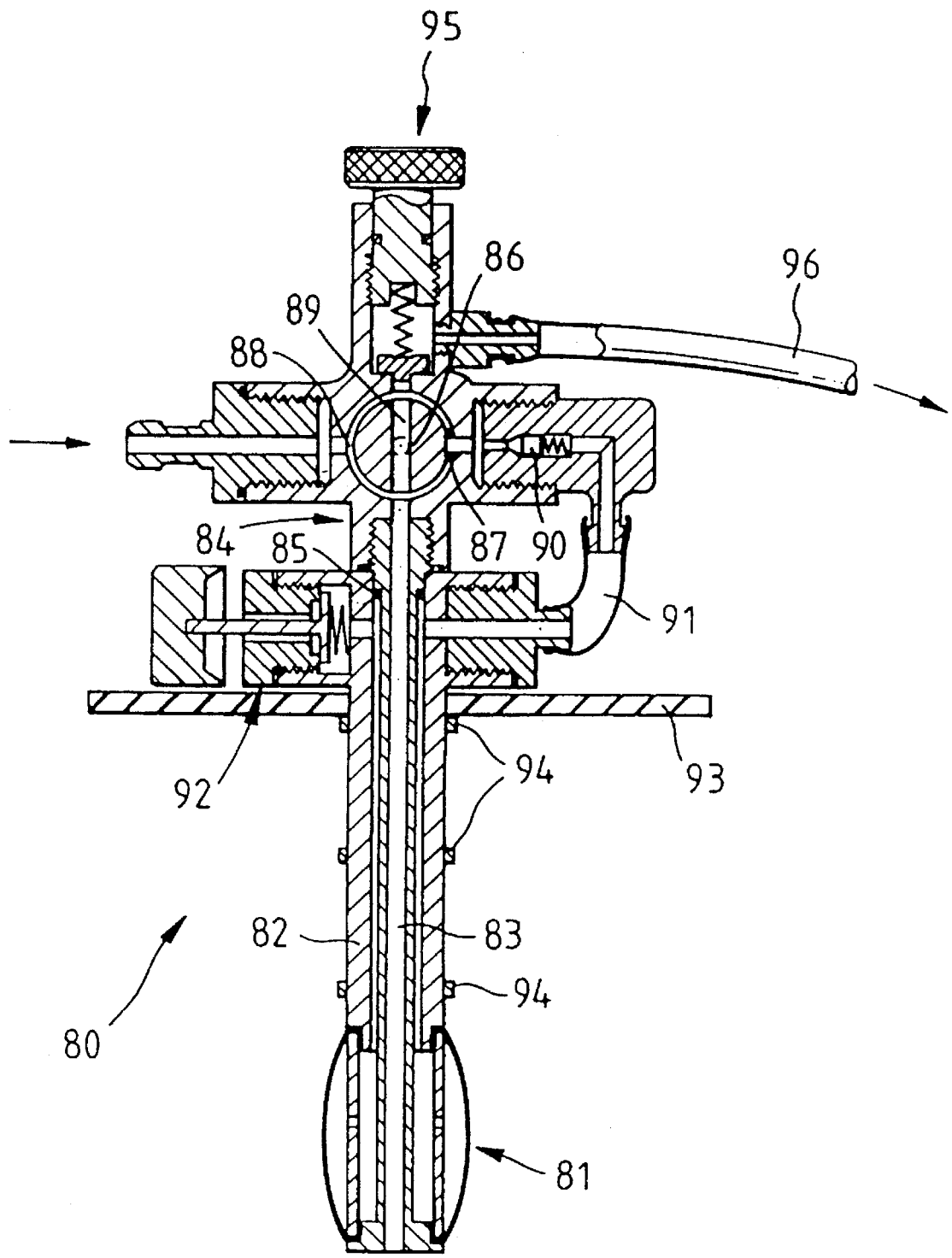
FIG. 4 is a sectional view of a further embodiment of a device according to the invention.

FIG. 4 shows a further device according to an embodiment of the invention. The device 80 has an elongate head 81 having a hollow stem 82 within which a hollow spindle 83 is received. The spindle 83 projects through a body 84.

One end of the spindle 83 receives a bladder assembly constructed in an identical manner to that of the assembly of FIGS. 3 and 3A. Seal ring 85 extends around an upper end of the spindle 83 and prevents the space between the spindle 83 and stem 82 from communicating with spaces above the seal 85.

A diverter valve 86 is located within an upper part of the body and carries a seal 87 which in the position shown prevents the spherical flow path 88 and the diametric flow path 89 from communicating with the bladder contained on the head 81.

A one way valve 90 is located in the path which supplies air to the bladder and ensures that if the air supply to the head 81 is discontinued, the bladder remains inflated. Fluid line 91 ensures that air is able to enter the space between the spindle 83 and the stem to allow inflation of the bladder. Dump valve 92 enables the bladder to be deflated at the completion of a test. Splash guard 93 extends around the stem and may be selectively positioned relative to abutments 94 along the length of the stem.

A pressure relief valve 95 projects from the body 84 and functions to vent excess pressure to the atmosphere via venting tube 96.

In the position shown valve 95 functions to vent excess pressure in the object being tested. With valve 86 rotated to move seal 87 from the passage leading to valve 90 the valve 95 functions to limit bladder inflation pressure.

With the valve 86 rotated to a position where seal 87 no longer prevents fluid from spherical passage 88 from flowing through one way valve 90 the bladder may be inflated but only up to a pressure determined by relief valve 95. Rotation of valve 86 is achieved by manipulating an external control member not visible in this view.

With valve 86 in the position shown air may pass through the spindle and into the object being tested up to a pressure governed by valve 95.

With the device of the invention the head construction ensures that a universal fit is assured regardless of the size or configuration of the opening in the vessel or other object or system being pressure tested. Thus for testing vehicle cooling systems the plurality of adaptor cap fittings of the prior art are eliminated.

I claim:

1. A cooling system pressure testing device for attachment in an inlet opening of a component of the cooling system to be pressure tested, the cooling system pressure testing device including a body having an inlet and an inlet valve communicating with the body inlet, a sealing head positionable in the opening and having a support and a bladder having an inlet secured to and extending about the support, a passage extending through the bladder and having an inlet and an outlet, the body inlet and the valve allowing fluid from a single source to be selectively directed to either the passage inlet or the bladder inlet to either pressurize the component to be pressure tested or to inflate the bladder, and a pressure relief valve in communication with the passage for limiting the pressure to which the test is conducted and which is operable to vent the pressure within the component without deflating the bladder whereby the bladder may be inflated to close off the inlet opening and the passage enabling the system to be pressurized up to a pressure determined by the pressure relief valve while the bladder closes off the inlet opening.

2. The cooling system pressure testing device of claim 1 wherein the body includes a hollow stem extending therefrom, a hollow spindle located within the stem and the sealing head is located about a distal end of the spindle and in abutment with the stem.

3. The cooling system pressure testing device of claim 2 wherein the body has a valve passage, the inlet valve including a valve spindle within the valve passage and connectable to the source of fluid, a valve member within the valve spindle which normally seals a flow passage through the valve spindle to thereby prevent fluid from entering the fluid passage employed to pressurize the object being tested and a bypass passage for causing fluid to bypass the valve and allowing fluid to communicate with the bladder.

4. The cooling system pressure testing device of claim 3 wherein the bypass passage includes a transverse passage extending through the valve spindle and a second passage extending through the body from the transverse passage and communicating with the hollow stem.

5. The cooling system pressure testing device of claim 4 wherein the hollow spindle is clearance fitted within the hollow stem and has a transverse port communicating with the interior of the hollow spindle and with the passage through the valve spindle.

6. The cooling system pressure testing device of claim 4 wherein the pressure relief valve is operative for limiting the pressure to which the bladder may be inflated and for allowing the bladder to be vented.

7. The cooling system pressure testing device of claim 3 wherein the distal end of the spindle is stepped.

8. The cooling system pressure testing device of claim 1 including a pressure gauge mounted to the body and in communication with the body inlet for indicating the pressure to which the test is conducted.

9. The cooling system pressure testing device of claim 1 wherein the support has a transverse opening therethrough.

10. The cooling system pressure testing device of claim 1 wherein the bladder has return portions which extend along an inner wall of the bladder support.

11. The cooling system pressure testing device of claim 1 including a dump valve for venting pressure within the bladder.

12. The cooling system pressure testing device of claim 1 wherein the bladder, when deflated, is substantially cylindrical in shape.

13. The cooling system pressure testing device of claim 1, wherein the head is flexible.

* * * * *